United States Patent
Lobo et al.

(10) Patent No.: US 10,457,204 B2
(45) Date of Patent: Oct. 29, 2019

(54) VEHICLE ILLUMINATED DISPLAY

(71) Applicant: Ford Global Technologies, LLC, Dearborn, MI (US)

(72) Inventors: Harry Lobo, Canton, MI (US); Paul Kenneth Dellock, Northville, MI (US); Stuart C. Salter, White Lake, MI (US); Thomas F. Boettger, Dearborn, MI (US); David Brian Glickman, Southfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 11 days.

(21) Appl. No.: 15/902,235

(22) Filed: Feb. 22, 2018

(65) Prior Publication Data

US 2019/0255993 A1    Aug. 22, 2019

(51) Int. Cl.
| | |
|---|---|
| *F21V 1/00* | (2006.01) |
| *B60Q 3/68* | (2017.01) |
| *B60Q 3/208* | (2017.01) |
| *B60Q 1/26* | (2006.01) |
| *F21S 43/16* | (2018.01) |
| *B60R 11/02* | (2006.01) |
| *G09F 13/20* | (2006.01) |

(Continued)

(52) U.S. Cl.
CPC .............. *B60Q 3/68* (2017.02); *B60Q 1/268* (2013.01); *B60Q 1/503* (2013.01); *B60Q 3/208* (2017.02); *B60R 11/0229* (2013.01); *F21S 43/16* (2018.01); *G09F 13/20* (2013.01); *B60R 2011/0026* (2013.01)

(58) Field of Classification Search
CPC ... B60Q 3/68; B60Q 3/78; B60Q 3/14; B60Q 1/32; B60Q 1/323; B60Q 3/62; B60Q 3/64; B60Q 3/66; G02B 6/0028; G02B 6/0088

USPC .................... 362/277, 609, 80, 84; 252/301.4
See application file for complete search history.

(56) References Cited

U.S. PATENT DOCUMENTS

| | | | |
|---|---|---|---|
| 5,680,719 | A | 10/1997 | Poser |
| 6,300,870 | B1 | 10/2001 | Nelson |
| 9,008,904 | B2 | 4/2015 | Szczerba et al. |

(Continued)

FOREIGN PATENT DOCUMENTS

| | | |
|---|---|---|
| CN | 202294494 | 7/2012 |
| CN | 104836519 | 8/2015 |

OTHER PUBLICATIONS

Quantum Dot LEDs that Enable Heads-Up Display of Transparent Images on Car Windshields; University of Florida Office of Technologies; 2 pages; Dec. 14, 2017.

*Primary Examiner* — Matthew J. Peerce
(74) *Attorney, Agent, or Firm* — Vichit Chea; Price Heneveld LLP

(57) ABSTRACT

A vehicle is provided that includes a transparency that includes a substantially transparent exterior substrate, a substantially transparent interior substrate, an interlayer positioned between the exterior and interior substrates, a first plurality of perovskites positioned between the interior substrate and the interlayer, and a second plurality of perovskites positioned between the interior substrate and the interlayer. A first series of light sources is positioned to emit a first light on the first and second pluralities of perovskites. The first plurality of perovskites are configured to emit light having a wavelength of from about 620 nm to about 750 nm in response to the first light.

20 Claims, 7 Drawing Sheets

(51) Int. Cl.
*B60Q 1/50* (2006.01)
*B60R 11/00* (2006.01)

(56) References Cited

U.S. PATENT DOCUMENTS

| | | | |
|---|---|---|---|
| 9,419,174 B2 | 8/2016 | Zheng et al. | |
| 2006/0256545 A1* | 11/2006 | Wang | G01D 11/28 |
| | | | 362/487 |
| 2010/0110657 A1* | 5/2010 | Weindorf | B60K 35/00 |
| | | | 362/23.01 |
| 2013/0335994 A1* | 12/2013 | Mulder | F21V 9/00 |
| | | | 362/555 |
| 2017/0178269 A1 | 6/2017 | McKinnon et al. | |
| 2017/0334342 A1 | 11/2017 | Dellock et al. | |
| 2019/0093010 A1* | 3/2019 | Rand | C30B 7/14 |

\* cited by examiner

VEHICLE ILLUMINATED DISPLAY

FIELD OF THE INVENTION

The present disclosure generally relates to illuminated displays, and more particularly to vehicle illuminated displays.

BACKGROUND OF THE INVENTION

As manufacturers are developing conventional vehicles and/or autonomous vehicles which may be used for or operated by a variety of services, it may be advantageous to provide unique identifiers to the vehicle which may change based on the service offered.

SUMMARY OF THE INVENTION

According to at least one example of the present disclosure, a vehicle is provided that includes a transparency that includes a substantially transparent exterior substrate, a substantially transparent interior substrate, an interlayer positioned between the exterior and interior substrates, a first plurality of perovskites positioned between the interior substrate and the interlayer, and a second plurality of perovskites positioned between the interior substrate and the interlayer. A first series of light sources is positioned to emit a first light on the first and second pluralities of perovskites. The first plurality of perovskites are configured to emit light having a wavelength of from about 620 nm to about 750 nm in response to the first light.

According to another example of the present disclosure, a method of illuminating a transparency is provided that includes the steps of: illuminating a first plurality and a second plurality of perovskites positioned on an interlayer of the transparency; charging the first plurality of perovskites but not the second plurality of perovskites using the first light; and emitting light having a wavelength of from about 620 nm to about 750 nm from the first plurality of perovskites.

According to yet another example of the present disclosure, a method of illuminating a transparency is provided that includes the steps of: illuminating a first plurality of perovskites and a second plurality of perovskites positioned on a transparency interlayer with a first light and a second light; charging the first plurality of perovskites but not the second plurality of perovskites using the first light; and charging the second plurality of perovskites but not the first plurality of perovskites using the second light.

These and other aspects, objects, and features of the present disclosure will be understood and appreciated by those skilled in the art upon studying the following specification, claims, and appended drawings.

BRIEF DESCRIPTION OF THE DRAWINGS

The following is a description of the figures in the accompanying drawings. The figures are not necessarily to scale, and certain features and certain views of the figures may be shown exaggerated in scale or in schematic in the interest of clarity and conciseness.

DETAILED DESCRIPTION

Figure 1A:
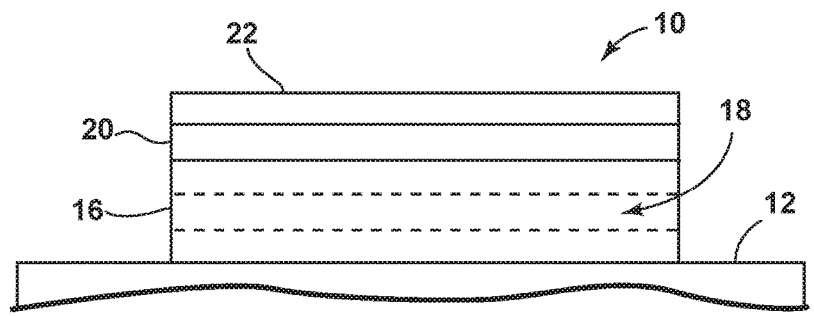
FIG. 1A is a side view of a photoluminescent structure rendered as a coating according to at least one example.

Additional features and advantages of the invention will be set forth in the detailed description which follows and will be apparent to those skilled in the art from the description, or recognized by practicing the invention as described in the following description, together with the claims and appended drawings.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures, and/or members, or connectors, or other elements of the system, may be varied, and the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

Figure 1B:
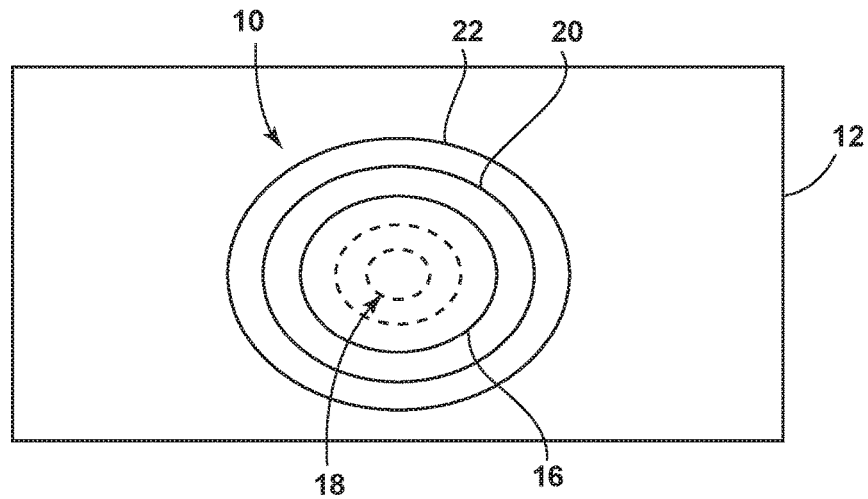
FIG. 1B is a top view of a photoluminescent structure rendered as a discrete particle, according to at least one example.
Figure 1C:
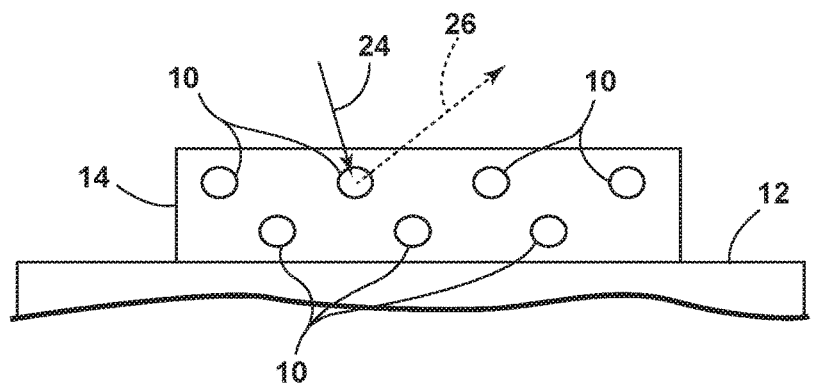
FIG. 1C is a side view of a plurality of photoluminescent structures rendered as discrete particles and incorporated into a separate structure, according to at least one example.

Referring to FIGS. 1A-1C, various exemplary embodiments of photoluminescent structures 10 are shown, each capable of being coupled to a substrate 12, which may correspond to a vehicle fixture or vehicle-related piece of equipment. In FIG. 1A, the photoluminescent structure 10 is generally shown rendered as a coating (e.g., a film) that may be applied to a surface of the substrate 12. In FIG. 1B, the photoluminescent structure 10 is generally shown as a discrete particle capable of being integrated with the substrate 12. In FIG. 1C, the photoluminescent structure 10 is generally shown as a plurality of discrete particles that may be incorporated into a support medium 14 (e.g., a film) that may then be applied (as shown) or integrated with the substrate 12.

At the most basic level, a given photoluminescent structure 10 includes an energy conversion layer 16 that may include one or more sublayers, which are exemplarily shown through broken lines in FIGS. 1A and 1B. Each sublayer of the energy conversion layer 16 may include one or more photoluminescent materials 18 having energy converting elements with phosphorescent, fluorescent and/or energy converting properties. Each photoluminescent material 18 may become excited upon receiving an excitation light 24 of a specific wavelength, thereby causing the light to undergo a conversion process. Under the principle of down conversion, the excitation light 24 is converted into a longer wavelength, converted light 26, that is outputted from the photoluminescent structure 10. Conversely, under the principle of up conversion, the excitation light 24 is converted into a shorter wavelength light that is outputted from the photoluminescent structure 10. When multiple distinct wavelengths of light are outputted from the photoluminescent structure 10 at the same time, the wavelengths of light may mix together and be expressed as a multicolor light.

Light emitted by the sun, ambient sources and/or light sources which excite the photoluminescent material 18 is referred to herein as excitation light 24 and is illustrated herein as solid arrows. In contrast, light emitted from the photoluminescent structure 10 is referred to herein as converted light 26 and is illustrated herein as broken arrows. The mixture of excitation light 24 and converted light 26 that may be emitted simultaneously is referred to herein as outputted light.

The energy conversion layer 16 may be prepared by dispersing the photoluminescent material 18 in a polymer matrix to form a homogenous mixture using a variety of methods. Such methods may include preparing the energy conversion layer 16 from a formulation in a liquid carrier support medium 14 and coating the energy conversion layer 16 to a desired substrate 12. The support medium 14 may include an optically transparent or translucent material such as polymethylmethacrylate, nylon, polycarbonate, polyester, polyvinyl chloride, other visually transparent materials and/or combinations thereof. The energy conversion layer 16 may be applied to the substrate 12 by painting, screen-printing, spraying, slot coating, dip coating, roller coating, bar coating and/or other application methods. Alternatively, the energy conversion layer 16 may be prepared by methods that do not use a liquid carrier support medium 14. For example, the energy conversion layer 16 may be rendered by dispersing the photoluminescent material 18 into a solid-state solution (homogenous mixture in a dry state) that may be incorporated in a polymer matrix, which may be formed by extrusion, injection molding, compression molding, calendaring, thermoforming, etc. The energy conversion layer 16 may then be integrated into the substrate 12 using any methods known to those skilled in the art. When the energy conversion layer 16 includes sublayers, each sublayer may be sequentially coated to form the energy conversion layer 16. Alternatively, the sublayers can be separately prepared and later laminated or embossed together to form the energy conversion layer 16. Alternatively still, the energy conversion layer 16 may be formed by coextruding the sublayers.

In some examples, the converted light 26 that has been down converted or up converted may be used to excite other photoluminescent material(s) 18 found in the energy conversion layer 16. The process of using the converted light 26 outputted from one photoluminescent material 18 to excite another, and so on, is generally known as an energy cascade and may serve as an alternative for achieving various color expressions. With respect to either conversion principle, the difference in wavelength between the excitation light 24 and the converted light 26 is known as the Stokes shift and serves as the principal driving mechanism for an energy conversion process corresponding to a change in wavelength of light. In the various examples discussed herein, each of the photoluminescent structures 10 may operate under either conversion principle.

Referring back to FIGS. 1A and 1B, the photoluminescent structure 10 may optionally include at least one stability layer 20 to protect the photoluminescent material 18 contained within the energy conversion layer 16 from photolytic and thermal degradation. The stability layer 20 may be configured as a separate layer optically coupled and adhered to the energy conversion layer 16. Alternatively, the stability layer 20 may be integrated with the energy conversion layer 16. The photoluminescent structure 10 may also optionally include a protective layer 22 optically coupled and adhered to the stability layer 20 or other layer (e.g., the conversion layer 16 in the absence of the stability layer 20) to protect the photoluminescent structure 10 from physical and chemical damage arising from environmental exposure. The stability layer 20 and/or the protective layer 22 may be combined with the energy conversion layer 16 through sequential coating or printing of each layer, sequential lamination or embossing, or any other suitable means.

According to various examples, the photoluminescent material 18 may include quantum dots or perovskites. For the purposes of this disclosure, a perovskite is any material with the same type of crystal structure as calcium titanium oxide ($CaTiO_3$) or $^{XII}A^{2+VI}B^{4+}X^{2-}_{3}$ with an oxygen atom in the face centers of the crystal. The general chemical formula for perovskite compounds is $ABX_3$, where A and B are two cations of very different sizes, and X is an anion that bonds to both. According to various examples, the A atoms are larger than the B atoms. According to various examples, a preferred cubic-symmetry structure has the B cation in 6-fold coordination, surrounded by an octahedron of anions, and the A cation in 12-fold cuboctahedral coordination.

According to various examples, the perovskite examples of the photoluminescent material 18 are configured to emit the converted light 26 in response to receiving the excitation emission 24. The perovskites may tightly confine either electrons or electron holes in all three spatial dimensions and may be photoluminescent. Perovskites may have a radius, or a distance half of their longest length, in the range of between about 1 nm and about 10 nm, or between about 2 nm and about 6 nm. Larger perovskites (e.g., radius of from about 5 nm to about 6 nm) may emit longer wavelength light resulting in the color of the light being such colors as orange or red. Smaller perovskites (e.g., radius of from about 2 nm to about 3 nm) may emit shorter wavelengths resulting in colors such as blue and green. Exemplary compositions of the perovskites may include $LaF_3$ nanocrystals that are doped (e.g., coated) with Yb—Er, Yb—Ho and/or Yb—Tm. In yet other examples, the perovskites may CsPb crystals including Cl, Br, I and may generally have the formula $CsPb(Cl/Br)_2$, $CsPbBr_3$, $CsPb(I/Br)_3$ and/or $CsPbI_3$. It will be understood that other types of perovskites may be utilized. In yet other examples, the perovskites may include InP/ZnS and/or CuInS/ZnS.

The excitation emission 24 of the perovskites may be in the ultraviolet (e.g., about 10 nm to about 400 nm), visible (e.g., about 400 nm to about 700 nm) and/or infrared (e.g., about 700 nm to about 1 mm) wavelength. According to various examples, the perovskites may be charged, excited or otherwise configured to emit light in response to receiving an excitation emission 24 having a wavelength of from about 340 nm to about 380 nm. For example, the excitation emission 24 may be about 340 nm or greater, about 345 nm or greater, about 350 nm or greater, about 355 nm or greater, about 360 nm or greater, about 370 nm or greater, about 375 nm or greater, about 380 nm or greater or any and all values and ranges therebetween.

The perovskites may be configured to emit light of various wavelengths once charged by the excitation emission 24. According to various examples, the perovskites may be configured to emit visible light having a wavelength of from about 400 nm to about 700 nm. For example, the perovskites may emit light having a wavelength of from about 380 nm to about 450 nm generally corresponding to violet light, from about 450 nm to about 495 nm generally corresponding to blue light, from about 495 nm to about 570 nm generally corresponding to green light, from about 570 nm to about 590 nm generally corresponding to yellow light, from about 590 nm to about 620 nm generally corresponding to orange light and/or from about 620 nm to about 750 nm generally corresponding to red light.

The converted light 26 from the perovskites may generally have thin, or narrow emission line width. For purposes of this disclosure, an emission line width may be the wavelength range over which the perovskite emits the converted light 26. For example, the perovskites may have an emission line width of about 100 nm or less, about 95 nm or less, about 90 nm or less, about 85 nm or less, about 80 nm or less, about 75 nm or less, about 70 nm or less, about 65 nm or less, about 60 nm or less, about 55 nm or less, about 50 nm or less, about 45 nm or less, about 40 nm or less, about 35 nm or less, about 30 nm or less, about 25 nm or less, about 20 nm or less, about 15 nm or less, about 10 nm or less, about 5 nm or less or any and all values and ranges there between.

The perovskites may have a high efficiency in the conversion of the excitation emission 24 to the converted emission 26. For purposes of this disclosure, efficiency is measured as the energy in the converted emission 26 emitted by the perovskite divided by the amount of energy input to the perovskite expressed as a percentage. The perovskites may have an efficiency of about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, about 96% or greater, about 97% or greater, about 98% or greater, about 99% or greater or any and all values and ranges therebetween.

The photoluminescent material 18, including the perovskites, may be substantially transparent to visible light. For example, the photoluminescent material 18 including the perovskites may have a transmittance at a wavelength of about 530 nm of about 40% or greater, about 45% or greater, about 50% or greater, about 55% or greater, about 60% or greater, about 65% or greater, about 70% or greater, about 75% or greater, about 80% or greater, about 85% or greater, about 90% or greater, about 95% or greater, about 96% or greater, about 97% or greater, about 98% or greater, about 99% or greater or any and all values and ranges therebetween. According to various examples, the photoluminescent material 18 including the perovskites may have a sufficiently high transmittance that the photoluminescent material 18 and/or perovskites may not be perceptible to the human eye.

Referring now to FIGS. 2-6, depicted is a vehicle 50 including a transparency 54. The transparency 54 includes an exterior substrate 58, an interior substrate 62, an interlayer 66 positioned between the exterior and interior substrates 58, 62. A first plurality of perovskites 70 is positioned between the interior substrate 62 and the interlayer 66. A second plurality of perovskites 74 is positioned between the interior substrate 62 and the interlayer 70. A first series of light sources 78 is positioned to emit a first light 82 on the first and second pluralities of perovskites 70, 74. The first plurality of perovskites 70 are configured to emit light (e.g., the converted light 26) having a wavelength from about 620 nm to about 750 nm in response to the first light 82. It will be understood that when referred to as the first plurality of perovskites 70 and the second plurality of perovskites 74, the foregoing description of the photoluminescent material 18 including the perovskites applies to the first and second pluralities of perovskites 70, 74. Further, the first and second pluralities of perovskites 70, 74 may be different than one another such that different wavelength bands excite each one, and each of the first and second pluralities of perovskites 70, 74 emit a different wavelength converted light 26. Further, the first light 82 and a second light 86 are forms of the excitation emission 24.

Figure 2:
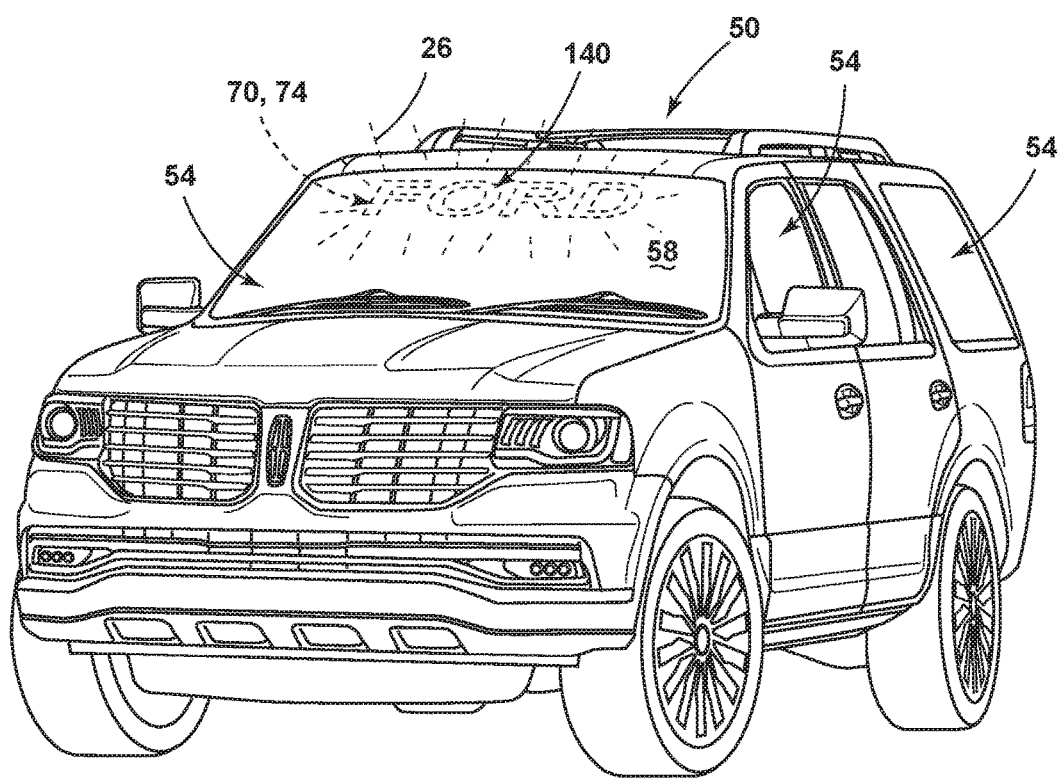
FIG. 2 is a front perspective view of a vehicle, according to at least one example.
Figure 3:
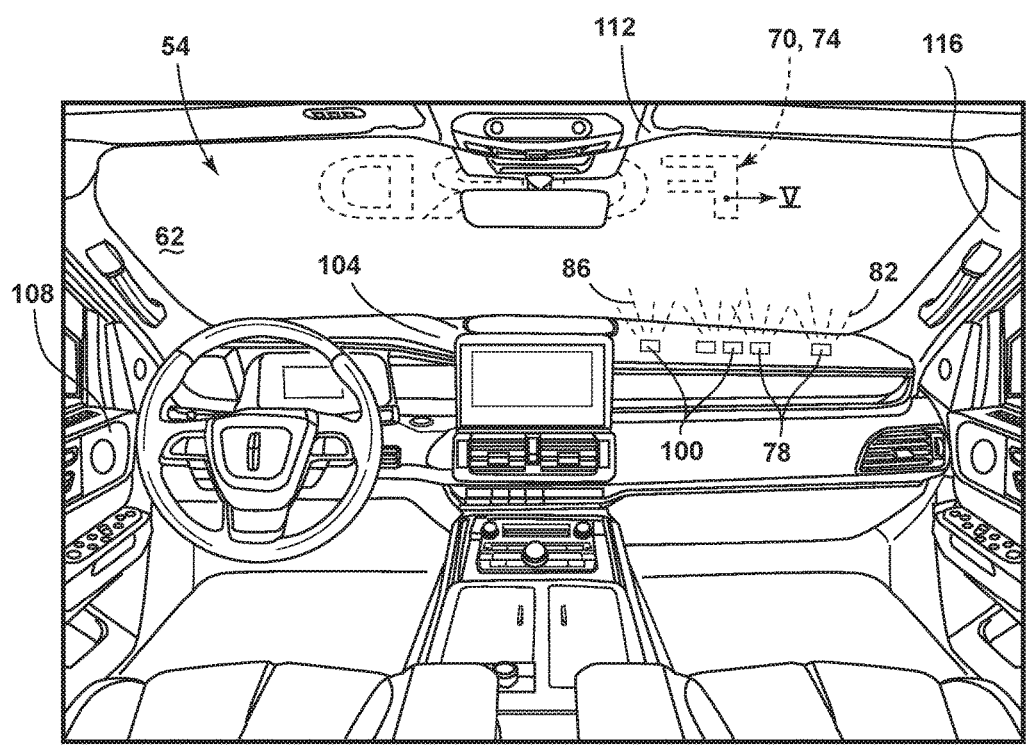
FIG. 3 is an elevational view of an interior of the vehicle, according to at least one example.
Figure 4:
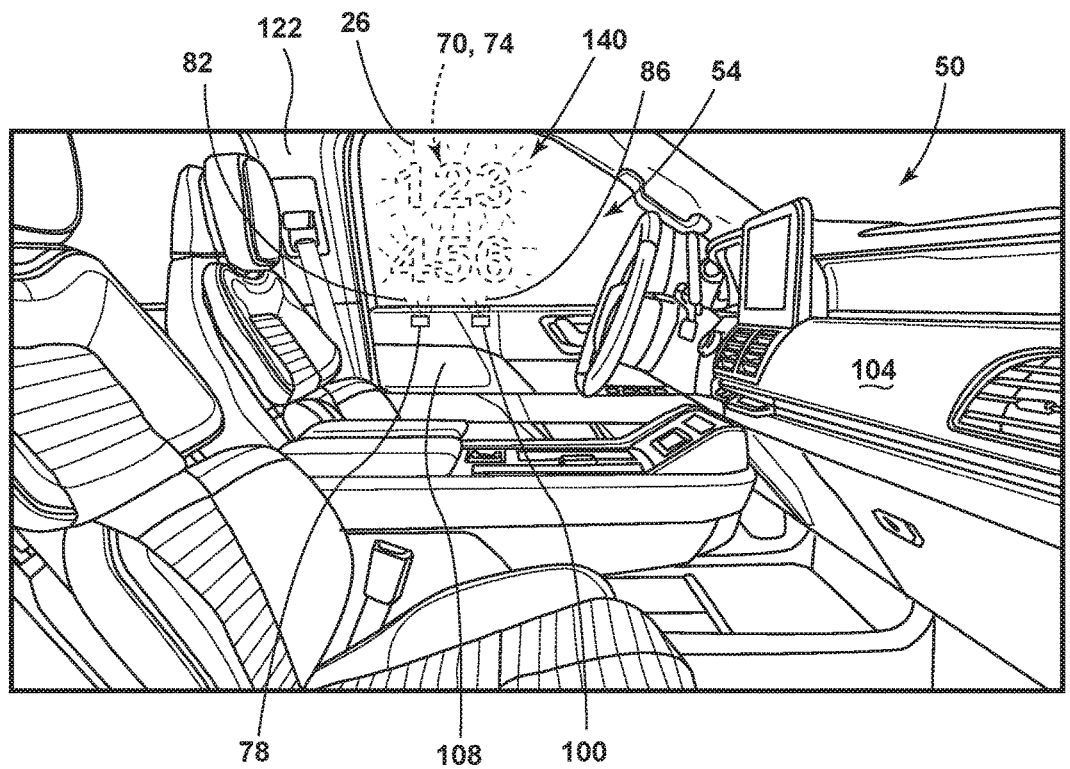
FIG. 4 is an elevational view of an interior of the vehicle, according to at least one example.

Referring now to FIGS. 2-4, the vehicle 50 is depicted as a sport utility vehicle, but it will be understood that the vehicle 50 may be a sedan, van, truck, cross-over or other vehicle 50 without departing from the teachings provided herein. The vehicle 50 may include one or more transparencies 54 positioned around the vehicle 50. For example, the transparency 54 may be a passenger window, a quarter window, an opera window, rear window, rear windshield, side windows, and other transparencies 54 coupled to the vehicle 50.

The vehicle 50 may include the first series of light sources 78 and a second series of light sources 100. The first and second series of light sources 78, 100 may be positioned in an interior and/or an exterior of the vehicle 50. In the depicted example of FIG. 3, the first and second series of light sources 78, 100 are positioned on an instrument panel 104 and in a door panel 108 in FIG. 4, but it will be understood that the first and/or second series of light sources 78, 100 may be positioned in a variety of locations around the vehicle 50. For example, the first and/or second series of light sources 78, 100 may be positioned in a headliner 112, an A-pillar 116, a B-pillar 122, or other locations around the vehicle 50. Each of the first and/or second series of light sources 78, 100 may include separated light sources (e.g., the light sources are scattered away from one another) or grouped light sources (e.g., the light sources are positioned proximate one another or are within the same housing/component). The first and/or second series of light sources 78, 100 may each contain two or more individual light sources. For example, the first and/or second series of light sources 78, 100 may include two or more, three or more, four or more or five or more individual light sources. The first and/or second series of light sources 78, 100 are configured to emit light onto the first and second pluralities of perovskites 70, 74.

The first series of light sources 78 are configured to emit the first light 82 and the second series of light sources 100 are configured to emit the second light 86. The first and/or second series of light sources 78, 100 may be configured emit to visible light (e.g., light having a wavelength of from about 400 nm to about 700 nm), infrared light (e.g., light having a wavelength of greater than about 700 nm) and/or ultraviolet light (e.g., light having a wavelength of from about 180 nm to about 400 nm). It will be understood that each of the light sources in the first and/or second series of light sources 78, 100 may be configured to emit different light or the same light as the other light sources. In other words, the first light 82 and the second light 86 may have the same wavelength or a different wavelength than one another. According to various examples, the first light 82 may have a wavelength of from about 310 nm to about 390 nm, or from about 320 nm to about 380 nm, or from about 330 nm to about 370 nm, or from about 340 nm to about 365 nm, or from about 350 nm to about 365 nm, or from about 360 nm to about 365 nm or any and all values and ranges therebetween. According to various examples, the second light 86 may have a wavelength of from about 310 nm to about 390 nm, or from about 320 nm to about 380 nm, or from about 330 nm to about 370 nm, or from about 340 nm to about 365 nm, or from about 350 nm to about 365 nm, or from about 360 nm to about 365 nm or any and all values and ranges therebetween. According to various examples, the first and second lights 82, 86 have a wavelength difference of about 70 nm or less, about 60 nm or less, about 50 nm or less, about 40 nm or less, about 30 nm or less, about 20 nm or less, about 10 nm or less, about 9 nm or less, about 8 nm or less, about 7 nm or less, about 6 nm or less, about 5 nm or less, about 4 nm or less, about 3 nm or less, about 2 nm or less, about 1 nm or less or any and all values and ranges therebetween.

The first and second series of light sources 78, 100 may be configured to the respective first and second lights 82, 86 onto the first and second pluralities of perovskites 70, 74 positioned within the transparency 54. The first and second series of light sources 78, 100 may emit a flood light (e.g., a large area of light falling on the transparency 54) and/or a concentrated light (e.g., laser or directed light) onto the transparency 54. In both flood and concentrated light examples, the first and second series of light sources 78, 100, both the first and second lights 82, 86 fall on, or impinge on, the first and second pluralities of perovskites 70, 74. As will be explained in greater detail below, the narrow and non-overlapping wavelength bands of light which excite the first and second pluralities of perovskites 70, 74 allow both the first and second lights 82, 86 to shine on the first and second pluralities of perovskites 70, 74 simultaneously while illuminating only one of the first and second pluralities of perovskites 70, 74. Such a feature may allow a variety of indicia 140 to be illuminated on the transparency 54.

Figure 5:
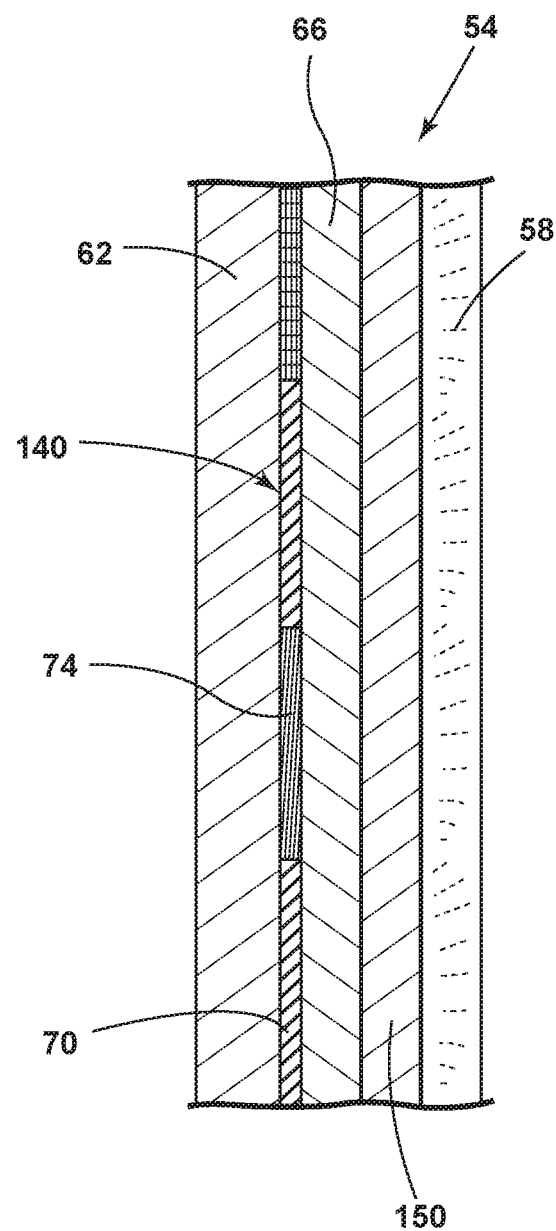
FIG. 5 is a cross-sectional view of taken at line V of FIG. 3, according to at least one example.

Referring now to FIG. 5, the transparency 54 may include the exterior and interior substrates 58, 62. For purposes of this disclosure, the exterior substrate 58 is positioned on an outboard, or outer, side of the transparency 54 while the interior substrate 62 is positioned on an inboard, or inner, side of the transparency 54. In other words, the exterior substrate 58 is exposed to the environment around the vehicle 50 while the interior substrate 62 is exposed to an interior cabin of the vehicle 50. The exterior and/or interior substrates 58, 62 may be composed of a material which is transparent or substantially transparent to visible light (e.g., light having a wavelength of from about 400 nm to about 700 nm). It will be understood that the exterior and/or interior substrates 58, 62 may have a different level of transmittance of infrared light (e.g., light having a wavelength of greater than about 700 nm) and/or ultraviolet light (e.g., light having a wavelength of from about 180 nm to about 400 nm) as compared to the transmittance of visible light. The exterior and/or interior substrates 58, 62 may be composed of a glass, polymeric material and/or combinations thereof. In glass examples, the exterior and/or interior substrates 58, 62 may be composed of soda-lime float glass, alkaline earth boro-aluminosilicate glass, alkali-aluminosilicate glass, borosilicate glass, chemically strengthened glass, heat-strengthened glass, insulated glass, tempered glass and/or combinations thereof. In polymeric examples, the exterior and/or interior substrates 58, 62 may be composed of polysulfone, acrylic, polycarbonate, cycloolefin, polyethylene terephthalate, polyethylene naphthalate, polyimide, polychlorotrifluoroethylene, polyphenylene sulfide, poly(m-ethyl methacrylate), high density polyethylene, acrylonitrile butadiene styrene, polyvinyl alcohol, ethylene vinyl alcohol, moisture-resistant polymers and/or combinations thereof. It will be understood that the materials of the exterior and interior substrates 58, 62 may be different than one another.

The exterior and/or interior substrates 58, 62 may each have a thickness of from about 1 mm to about 2.5 mm. For example, the individual thicknesses of the exterior and/or interior substrates 58, 62 may be about 1.0 mm or greater, about 1.1 mm or greater, about 1.2 mm or greater, about 1.3 mm or greater, about 1.4 mm or greater, about 1.5 mm or greater, about 1.6 mm or greater, about 1.7 mm or greater, about 1.8 mm or greater, about 1.9 mm or greater, about 2.0 mm or greater, about 2.1 mm or greater, about 2.3 mm or greater, about 2.4 mm or greater, about 2.5 mm or greater or any and all values and ranges therebetween. It will be understood that the thicknesses of the exterior and/or interior substrates 58, 62 may vary over the length of the substrates 58, 62.

The interlayer 66 is positioned between the exterior substrate 58 and the interior substrate 62. The interlayer 66 may extend across only a portion of an interface between the exterior and interior substrates 58, 62, or may extend across the entire interface. As such, the transparency 54 may be known as a laminated article. According to various examples, the interlayer 66 may be composed of a polymeric material. For example, the interlayer 66 may be composed of polyvinyl butyral or ethylene-vinyl acetate (EVA), polycarbonate, thermoplastic polyurethane, thermoplastic materials, thermoset EVA, polyethylene terephthalate and/or combinations thereof.

The interlayer 66 may each have a thickness of from about 0.2 mm to about 0.5 mm. For example, the thickness of the interlayer 66 may be about 0.2 mm or greater, about 0.25 mm or greater, about 0.27 mm or greater, about 0.3 mm or greater, about 0.32 mm or greater, about 0.34 mm or greater, about 0.36 mm or greater, about 0.38 mm or greater, about 0.4 mm or greater, about 0.42 mm or greater, about 0.44 mm or greater, about 0.46 mm or greater, about 0.48 mm or greater, about 0.5 mm or greater or any and all values and ranges therebetween. It will be understood that the thicknesses of interlayer 66 may vary over the length of the transparency 54.

According to various examples, the interlayer 66 may include one or more ultraviolet inhibitors which are configured to absorb, block and/or reflect ultraviolet light having a wavelength of about 380 nm and shorter. The ultraviolet inhibitors may include benzophenone as well as other compounds configured to inhibit ultraviolet light. Additionally or alternatively, the ultraviolet inhibitors may be provided as an ultraviolet inhibitor layer 150 positioned between the exterior substrate 58 and the interlayer 66. Such an ultraviolet inhibitor layer 150 may be advantageous in preventing the first and second pluralities of perovskites 70, 74 from being charged by ambient illumination around the vehicle 50. It will be understood that the ultraviolet inhibitor layer 150 may be configured to absorb, block and/or reflect ultraviolet light having a wavelength of about 380 nm and shorter.

According to various examples, the first and second pluralities of perovskites 70, 74 are positioned between the interior substrate 62 and the interlayer 66. Additionally or alternatively, the first and second pluralities of perovskites 70, 74 may be positioned between the exterior substrate 58 and the interlayer 66 (i.e., between the ultraviolet inhibitor layer 150 and the interlayer 66). The first and second pluralities of perovskites 70, 74 may be positioned across the transparency 54 in a variety of forms. For example, the first and/or second pluralities of perovskites 70, 74 may be disposed as an indicia 140 across the transparency 54 and/or as a plurality of pixels across the transparency 54. In indicia 140 examples of the first and second pluralities of perovskites 70, 74, the indicia 140 may be in the form of text, numbers, symbols, pictures and/or combinations thereof. The placement of the first plurality of perovskites 70 defines a first indicium and the placement of the second plurality of perovskites 74 may define a second indicium. Further, the first and second indicia may cooperate to define the indicium 140. In the pixel examples of the first and second pluralities of perovskites 70, 74, each of the pixels may be a small grouping of the first and/or second pluralities of perovskites 70, 74. Pixel examples of the first and second pluralities of perovskites 70, 74 allow the concentrated examples of the first and/or second lights 82, 86 to pass over the pixels and selectively illuminate one set (e.g., either the pixels of the first or second pluralities of perovskites 70, 74).

The first and/or second pluralities of perovskites 70, 74 may be applied within the transparency 54 as a film. In a first method of applying the first and/or second pluralities of perovskites 70, 74, the first and/or second pluralities of perovskites 70, 74 may be blended directly into a binder. Next, the mixture of the first and/or second pluralities of perovskites 70, 74 and binder may be extruded into a thin sheet of film which is applied in the transparency 54. Another exemplary method of applying the first and/or second pluralities of perovskites 70, 74 is to apply a thin coating of the first and/or second pluralities of perovskites 70, 74 to a surface (e.g., the interior substrate 62 and/or interlayer 66). To do this, the first and/or second pluralities of perovskites 70, 74 are first blended into a polymer or a polymerizable mixture of monomers. Next, the mixture is then spin coated, ink jetted, screen printed and/or otherwise applied as a thin layer over a surface (e.g., the interior substrate 62 and/or interlayer 66). Monomer mixtures can be polymerized (cured) on the surface after application. Using this approach, it may be important to assure that the polymer or monomer mixture is lipophilic (non-polar) if organic soluble first and/or second pluralities of perovskites 70, 74 are being used. Conversely, if water-soluble first and/or second pluralities of perovskites 70, 74 are being used, the polymer or monomers may be hydrophilic (water soluble). It will be understood that various inks, dyes, pigments or colorants may be added to the first and/or second pluralities of perovskites 70, 74. Further, the first and/or second pluralities of perovskites 70, 74 may be applied as an aqueous, liquid, paste and/or powder form to the interlayer 66 and/or the interior substrate 58.

In operation, the first and/or second series of light sources 78, 100 (FIG. 4) may be configured to emit the first and second lights 82, 86 to preferentially excite the first and second pluralities of perovskites 70, 74. For example, the first series of light sources 78 may provide the flood examples of the first light 82 to the transparency 54 such that a portion, a majority, substantially all or all of the first plurality of perovskites 70 are excited and begin to glow to form the indicium 140. In another example, the second series of light sources 100 may provide the flood examples of the second light 86 to the transparency 54 such that a portion, a majority, substantially all or all of the second plurality of perovskites 74 are excited and begin to glow to form the indicium 140. In yet another example, one or more of the first and/or second series of light sources 78, 100 may be configured to raster confined examples of the first and/or second lights 82, 86 across the transparency 54 in a pattern such that only the first and/or second pluralities of perovskites 70, 74 that receive the light are excited. Such an example may be advantageous in pixel examples of the first and second pluralities of perovskites 70, 74 as the first and/or second series of light sources 78, 100 may "write" separate indicia 140 into the transparency 54 (e.g., owing to the narrow and non-overlapping excitation bands of the first and second pluralities of perovskites 70, 74). As explained above, the second plurality of perovskites 74 may be configured to not emit light in response to the first light 82 from the first series of light sources 78 and the first plurality of perovskites 70 may be configured to not emit light in response to the second light 86 from the second plurality of light sources 100.

Figure 6:
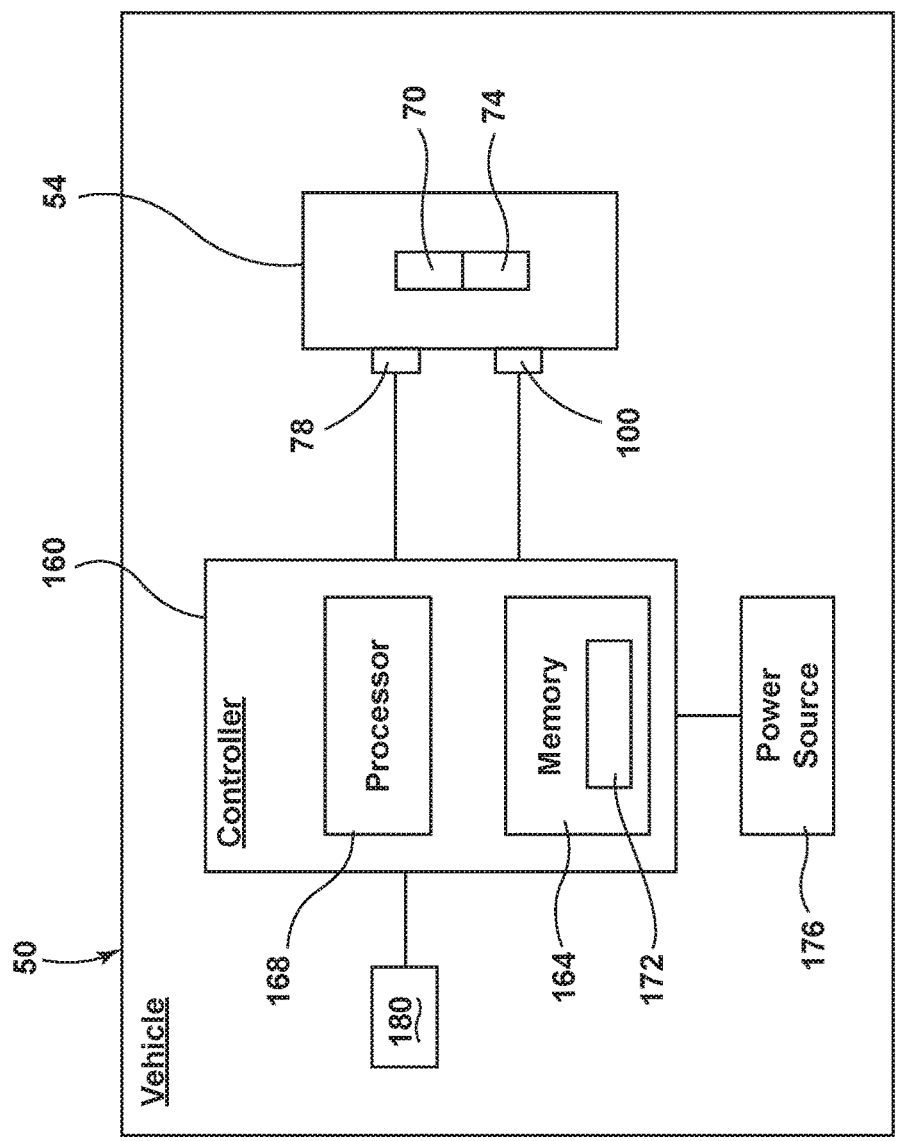
FIG. 6 is a schematic view of the vehicle, according to at least one example.

Referring now to FIG. 6, a block diagram of the vehicle 50 is shown in which the transparency 54 is included. The vehicle 50 includes a controller 160 in communication with the first and second series of light sources 78, 100. The controller 160 may include a memory 164 having instructions contained therein that are executed by a processor 168 of the controller 160. The memory 164 may include one or more light control routines 172. The controller 160 may provide electrical power to the first and second series of light sources 78, 100 via a power source 176 located onboard the vehicle 50. The vehicle 50 may include one or more transmitters 180 which are configured to electronically communicate with a network external to the vehicle 50. The transmitter 180 may then communicate with the controller 160 to initiate one or more of the light control routines 172 stored in the memory 164.

According to various examples, the vehicle 50 may be an autonomous vehicle 50 and/or a vehicle 50 used in a ride-sharing program. In such examples, the vehicle 50 may be ordered, or instructed, to a location using a mobile device by a customer. An identifier may be sent to the customer's mobile device such that the identifier is displayed on the vehicle 50 (e.g., as the indicium 140 using the light control routine 172) so the customer will know which vehicle 50 is coming to pick them up. Such an example may be advantageous in allowing the vehicle 50 to have clear windows (e.g., the transparency 54) during normal usage so a passenger's field of view is uninterrupted during travel to and from their destination while also allowing messages to be displayed to viewers of the vehicle 50.

According to various examples, the light control routine 172 may be used to provide preprogrammed messages which are displayed to viewers of the vehicle 50. For example, the first and/or second pluralities of perovskites 70, 74 may be positioned within the transparency 54 to form the indicium 140 as a message (e.g., stop, clear, moving, stopping, accelerating, etc.). As explained above, as the first and/or second pluralities of perovskites 70, 74 have non-overlapping excitation bands such that illumination from the first and/or second series of light sources 78, 100 selectively illuminates the first and/or second pluralities of perovskites 70, 74 thereby creating the indicium 140 on the transparency 54.

Figure 7:
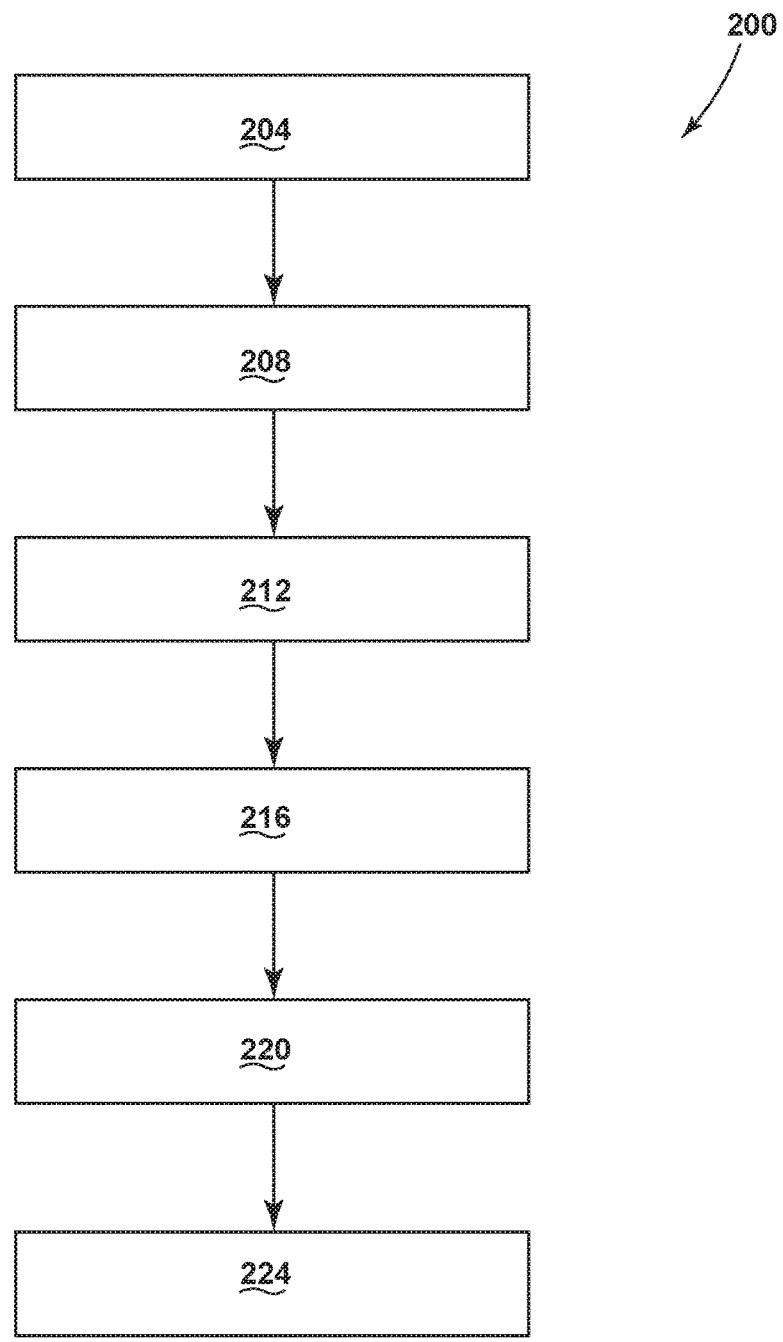
FIG. 7 is a flow chart of illuminating a transparency, according to at least one example.

Referring now to FIG. 7, depicted is an example of a method 200 of operating the light control routine 172. The method 200 may begin with a step 204 of illuminating the first plurality and the second plurality of perovskites 70, 74 positioned on the interlayer 66 of the transparency 54. The step 204 may include illuminating an entirety of the first plurality of perovskites 70 and an entirety of the second plurality of perovskites 74 in the first light 82. As explained above, the first and second lights 82, 86 may be emitted to have a difference in wavelength of about 40 nm or less. Further, step 204 may include rastering the first light 82 across the first plurality of perovskites 70 and the second plurality of perovskites 74. As explained above, rastering of the first and/or second lights 82, 86 across the transparency 54 may serve to write the indicium 140.

Next, a step 208 of charging the first plurality of perovskites 70, but not the second plurality of perovskites 74, using the first light 82 is performed. As explained above, the narrow wavelength excitation bands of the first plurality and the second plurality of perovskites 70, 74 allows the both the first and second lights 82, 86 to fall on the he first plurality and the second plurality of perovskites 70, 74, but only produce selective charging. Next, a step 212 of emitting light having a wavelength of from about 620 nm to about 750 nm from the first plurality of perovskites 74 may be performed as a result of step 208.

Next, a step 216 of illuminating the first plurality of perovskites 70 and the second plurality of perovskites 74 in the second light 86 simultaneously with the first light 82 is performed. Performance of step 216 results in a step 220 of charging the second plurality of perovskites 74 but not the first plurality of perovskites 70 using the first light 82 is performed. Next, a step 224 of emitting light having a wavelength of from about 495 nm to about 570 nm from the second plurality of perovskites 74 is performed.

Use of the present disclosure may offer a variety of advantages. First, as the wavelength of the first and second lights 82, 86 is greater than about 310 nm, component and biological degradation may be reduced and/or eliminated from occurring. Second, use of the first and second pluralities of perovskites 70, 74 provide a low cost and simple solution for providing illumination to the transparency 54. Third, the first and second pluralities of perovskites 70, 74 provide sufficient illumination that the indicium 140 may be visible in high ambient illumination conditions. As explained above, use of the present disclosure allows the vehicle 50 to display messages on the side and front of the vehicle 50 that may identifying the vehicle 50.

According to various embodiments, a vehicle includes a transparency. The transparency includes a substantially transparent exterior substrate, a substantially transparent interior substrate, an interlayer positioned between the exterior and interior substrates, a first plurality of perovskites positioned between the interior substrate and the interlayer and a second plurality of perovskites positioned between the interior substrate and the interlayer. A first series of light sources is positioned to emit a first light on the first and second pluralities of perovskites. The first plurality of perovskites are configured to emit light having a wavelength of from about 620 nm to about 750 nm in response to the first light. Embodiments of the vehicle can include any one or a combination of the following features:

the interlayer comprises a polymeric material;
  an ultraviolet light inhibitor layer is positioned between the exterior substrate and the interlayer;
  the ultraviolet inhibitor layer is configured to absorb light having a wavelength of about 380 nm and shorter;
  the placement of the first plurality of perovskites defines a first indicium;
  the placement of the second plurality of perovskites defines a second indicium;
  the second plurality of perovskites are configured to not emit light in response to the first light from the first series of light sources;
  the first light has a wavelength of from about 360 nm to about 365 nm;
  a second series of light sources is configured to emit a second light on the first and second pluralities of perovskites, wherein the second plurality of perovskites are configured to emit light having a wavelength of from about 495 nm to about 570 nm;
  the first plurality of perovskites are configured to not emit light in response to the second light from the second plurality of light sources; and/or
  the first and second lights have a wavelength difference of about 40 nm or less.

According to various embodiments, a method of illuminating a transparency includes the steps of: illuminating a first plurality and a second plurality of perovskites positioned on an interlayer of the transparency; charging the first plurality of perovskites but not the second plurality of perovskites using the first light; and emitting light having a wavelength of from about 620 nm to about 750 nm from the first plurality of perovskites. Embodiments of the method can include any one or a combination of the following features:
- rastering the first light across the first plurality of perovskites and the second plurality of perovskites;
- illuminating the first plurality of perovskites and the second plurality of perovskites in a second light simultaneously with the first light;
- charging the second plurality of perovskites but not the first plurality of perovskites using the first light;
- emitting the first and second lights to have a difference in wavelength of about 40 nm or less;
- emitting light having a wavelength of from about 620 nm to about 750 nm from the first plurality of perovskites; and/or
- emitting light having a wavelength of from about 495 nm to about 570 nm from the second plurality of perovskites.

What is claimed is:

1. A vehicle comprising:
a transparency, comprising;
   a substantially transparent exterior substrate;
   a substantially transparent interior substrate;
   an interlayer positioned between the exterior and interior substrates;
   a first plurality of perovskites positioned between the interior substrate and the interlayer; and
   a second plurality of perovskites positioned between the interior substrate and the interlayer, wherein the first and second pluralities of perovskites are disposed as a matrix of pixels, and wherein each pixel of the matrix of pixels is independently activated to display different messages; and
a first series of concentrated light sources positioned distal to the transparency to emit a first light on the first and second pluralities of perovskites through the substantially transparent interior substrate, wherein the first plurality of perovskites are configured to emit light having a wavelength of from about 620 nm to about 750 nm in response to the first light.

2. The vehicle of claim 1, wherein the second plurality of perovskites are configured to not emit light in response to the first light from the first series of concentrated light sources.

3. The vehicle of claim 1, wherein the first light has a wavelength of from about 360 nm to about 365 nm.

4. The vehicle of claim 2, further comprising:
a second series of concentrated light sources configured to emit a second light on the first and second pluralities of perovskites, wherein the second plurality of perovskites are configured to emit a third light having a wavelength of from about 495 nm to about 570 nm.

5. The vehicle of claim 4, wherein the first plurality of perovskites are configured to not emit light in response to the second light from the second plurality of concentrated light sources.

6. The vehicle of claim 1, wherein at least one of the first and second pluralities of perovskites have a transmittance of about 80% or greater at a wavelength of about 530 nm.

7. The vehicle of claim 1, further comprising:
an ultraviolet light inhibitor layer positioned between the exterior substrate and the interlayer.

8. The vehicle of claim 7, wherein the ultraviolet inhibitor layer is configured to absorb light having a wavelength of about 380 nm and shorter.

9. The vehicle of claim 1, wherein the placement of the first plurality of perovskites defines a first indicium.

10. The vehicle of claim 9, wherein the placement of the second plurality of perovskites defines a second indicium.

11. The vehicle of claim 4, wherein the first and second lights have a wavelength difference of about 40 nm or less.

12. A method of illuminating a transparency, comprising the steps of:
providing a controller in a vehicle having a light control routine;
providing a first series of concentrated light sources to emit a first light in response to the light control routine;
illuminating a first plurality and a second plurality of perovskites positioned as a matrix of pixels between a substantially transparent interior substrate and an interlayer of a transparency positioned distal to the first series of concentrated light sources, wherein the interlayer is positioned between the substantially transparent interior substrate and a substantially transparent exterior substrate;
selectively charging the first plurality of perovskites but not the second plurality of perovskites using the first light emitted through the substantially transparent interior substrate;
emitting a second light having a wavelength of from about 620 nm to about 750 nm from the first plurality of perovskites; and
independently activating each pixel of the matrix of pixels in response to the first light to display a selected preprogrammed message.

13. The method of claim 12, wherein the step of illuminating the first plurality and the second plurality of perovskites further comprises:
rastering the first light across the first plurality of perovskites and the second plurality of perovskites.

14. The method of claim 12, wherein the step of illuminating the first plurality and the second plurality of perovskites further comprises:
illuminating an entirety of the first plurality of perovskites and an entirety of the second plurality of perovskites in the first light.

15. The method of claim 12, further comprising the step:
illuminating the first plurality of perovskites and the second plurality of perovskites in a second light simultaneously with the first light.

16. The method of claim 15, further comprising the step:
charging the second plurality of perovskites but not the first plurality of perovskites using the first light.

17. A method of illuminating a transparency, comprising the steps of:
providing a first plurality of perovskites and a second plurality of perovskites positioned as a matrix of pixels on a transparency interlayer in a vehicle, wherein the transparency interlayer is disposed between a substantially transparent interior substrate and a substantially transparent exterior substrate;
positioning a first series of concentrated light sources in the vehicle and distal to the transparency interlayer to emit a first light and a second light;
illuminating the first plurality of perovskites and the second plurality of perovskites with the first light and the second light emitted through the substantially transparent interior substrate;
charging the first plurality of perovskites but not the second plurality of perovskites using the first light;
charging the second plurality of perovskites but not the first plurality of perovskites using the second light; and displaying a selected preprogrammed message by independently activating each pixel of the matrix of pixels with the first and second lights, respectively.

18. The method of claim 17, wherein the step of illuminating a first plurality of perovskites and a second plurality of perovskites further comprising the step of:

emitting the first and second lights to have a difference in wavelength of about 40 nm or less.

19. The method of claim 17, further comprising the step of:

emitting a third light having a wavelength of from about 620 nm to about 750 nm from the first plurality of perovskites.

20. The method of claim 19, further comprising the step of:

emitting a fourth light having a wavelength of from about 495 nm to about 570 nm from the second plurality of perovskites.

* * * * *